Feb. 4, 1930.  G. A. PRITCHARD  1,745,866
VISOR FOR CLOSED CARS
Filed July 26, 1927
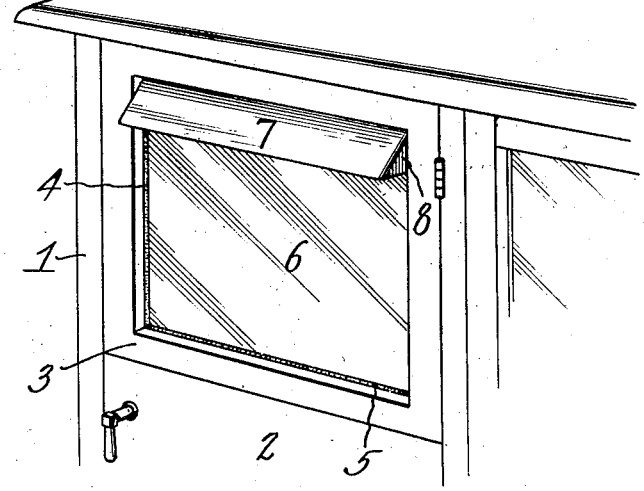
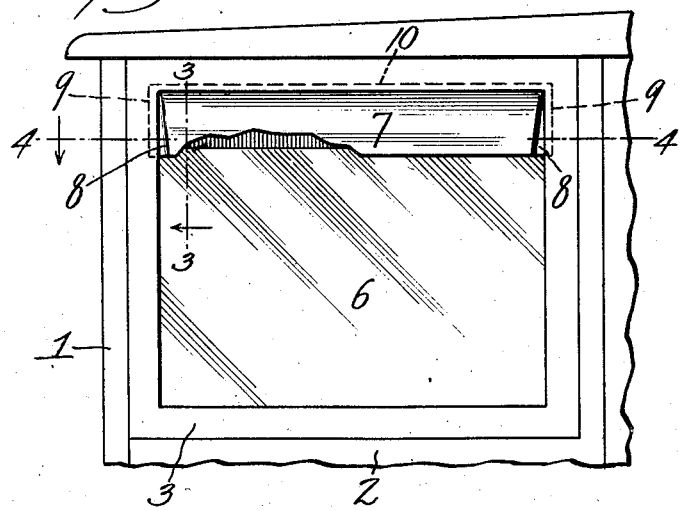
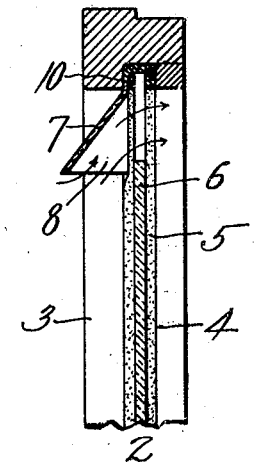
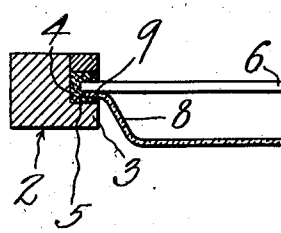
INVENTOR
George A. Pritchard
BY
Frederick W. Barker
ATTORNEY Patented Feb. 4, 1930

1,745,866

UNITED STATES PATENT OFFICE

GEORGE A. PRITCHARD, OF ATLANTIC BEACH, FLORIDA, ASSIGNOR TO NELLE WALES PRITCHARD

VISOR FOR CLOSED CARS

Application filed July 26, 1927. Serial No. 208,456.

This invention relates to means for ventilating the interiors of closed cars while also performing the services of keeping out rain etc. and shading a car interior from the sun's rays. With these objects in view my improvement is directed to a device which may be called a visor and is composed of resilient material, adapted to be sprung into the opposite runways of a window to be thereby securely but removably held in its operative position.

Usually the visor may be of opaque or transluscent material that it may intercept the glare of a top light, but when used solely as a ventilator the visor may be of transparent material. In either case the device is inclined downwardly outward and permits air to enter even when the window is raised to a point where its top edge is concealed by the lower edge of said visor.

Other features and advantages of my invention will hereinafter appear.

In the drawing:

Figure 1 is a partial perspective side elevation of a car showing a door with my improved visor adjusted at the top of the window therein.

Fig. 2 is a side view of the window with visor therein, the visor being partly broken away to expose the top edge of the window glass concealed thereby.

Fig. 3 is an enlarged sectional view, taken on the line 3—3 of Fig. 2, and

Fig. 4 is a horizontal sectional view, taken on the line 4—4 of Fig. 2.

In said views let 1 indicate the body of a closed car, 2 a door thereof, 3 the window frame, 4 the runways for the window glass, 5 the felt which lines said runways to avoid rattling, and 6 the window glass.

My improved visor, as will appear from the several views is composed of sheet material, and this material is required to be of resilient nature in order that it may be capable of flexing to be sprung into its operative position. The visor is composed of a substantially flat strip having a body or shade portion 7 and angled end portions 8 with flanges 9, while the upper end of the body portion has a flange 10 lying in the same plane as flanges 9. The body portion 7 is angled away from the plane of the flanges as shown in Figs. 1 and 3. To apply the visor to a car window the body portion 7 whose length may equal the width of the window, is to be flexed to such an extent that the flanges 9, which normally extend out sufficiently to lie within the runway, may thereby be inserted within the runway, while the top flange 10 may enter the groove in the top of the window frame which is adapted to receive the top edge of the window glass. Preferably the flanges 9 and 10 are inserted between the felt and runway surface. As the flanges 9 enter the runways the body portion 7 straightens in the relaxing of its tension, and the visor becomes firmly lodged in its operative position.

When thus adjusted to a car window the body portion 7 is angled outwardly in the manner of a canopy, and with the window glass raised to a point sligthly above the horizontal plane occupied by the lower edge of said body portion, will serve to keep out rain etc., while permitting the entrance of air. When a car is equipped with more than one visor the circulation of air thus permitted will keep the car interior relatively cool and fresh, though from the external appearance, with opaque visors, the windows may seem to be fully closed.

Variations within the spirit and scope of my invention are equally comprehended by the foregoing disclosure.

I claim:

1. A visor for the windows of motor cars, having a shade portion inclined downwardly outward from the top of a window frame, sides angled inwardly from said shade portion, and flanges outturned laterally from said sides, the said shade portion, sides and flanges being made of a single piece of sheet material, said flanges adapted to be sprung into the grooves at the sides of the window frame.

2. A visor for the windows of motor cars, having a shade portion inclined downwardly outward from the top of a window frame, sides angled inwardly from said shade portion, flanges outturned laterally from said sides, and a top flange angled from said shade portion, the said shade portion, sides and flanges being made of a single piece of sheet material, said side flanges adapted to be sprung into the grooves at the sides of the window frame and the top flange adapted to engage the groove at the top of said frame.

Dated, July 22nd, 1927.

GEORGE A. PRITCHARD.